Patented Jan. 29, 1946

2,393,746

UNITED STATES PATENT OFFICE 2,393,746

REARRANGED ENDOMETHYLENE-HEXAHYDRO-FLUORENE ISOTHIOCYANATE

Herman A. Bruson and Thomas W. Riener, Philadelphia, Pa., assignors to Röhm & Haas Company, Philadelphia, Pa., a corporation of Delaware No Drawing. Application September 12, 1944,
Serial No. 553,802

1 Claim. (Cl. 260—454)

This invention relates to new isothiocyanates of 3,5-endoethylene cyclopentanoindane, said products being those resulting from the addition-rearrangement reaction of thiocyanic acid and 1,4-endomethylene tetrahydro-$\Delta^2$-fluorene.

According to this invention 1,4-endomethylene tetrahydro-$\Delta^2$-fluorene,

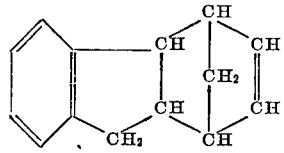

the Diels-Alder adduct of cyclopentadiene and indene, is reacted with nascent thiocyanic acid under conditions which promote preferentially addition of this acid to the unsaturated hydrocarbon over the polymerization of this acid. The reaction is carried out by mixing 1,4-endomethylene tetrahydro-$\Delta^2$-fluorene, water, and a salt of thiocyanic acid, such as sodium thiocyanate, potassium thiocyanate, ammonium thiocyanate, calcium thiocyanate, barium thiocyanate, or the like, and adding thereto a strong mineral acid, such as sulfuric, hydrochloric, or phosphoric, at a temperature sufficiently high to cause rapid addition of the liberated thiocyanic acid to the double bond of the hydrocarbon. The preferred temperature of reaction is from about 50° C. to about 100° C. With the addition reaction there occurs simultaneously a rearrangement of the endomethylene tetrahydrophenyl group to a new type of ring system. The product which is isolated is an isothiocyanate of 3,5-endoethylene cyclopentane having a phenylene methylene group forming therewith an indane group, thus

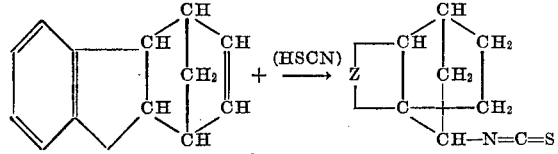

where Z is a benzylene group attached to the 4 and 5 carbon atoms of the cyclopentano group.

The following example illustrates this invention:

To a rapidly stirred mixture of 132 grams of 1,4 - endomethylene-$\Delta^2$-tetrahydro-fluorene, 80 grams of water, and 81 grams of sodium thiocyanate, heated to 95° C., there was gradually added dropwise 100 grams of concentrated hydrochloric acid during the course of thirty minutes.

The mixture was then heated for one hour longer at 95° C. with constant, vigorous stirring, and finally allowed to cool. The oil layer was separated, dissolved in benzene, filtered to remove traces of insoluble material, washed with water, dried, and distilled in vacuo.

The resulting indano endoethylene cyclopentanyl isothiocyanate distilled over at 170°–190° C. (1.5–2 mm.) as a pale yellow thick oil in a yield of 115–120 grams. Upon redistillation, the pure compound boiled at 178°–182° C./2 mm. It possesses a faint, not unpleasant odor and has the probable formula

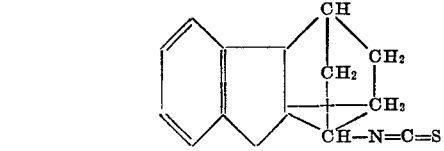

It is readily characterized as being an isothiocyanate by virtue of the fact that when warmed with concentrated ammonium hydroxide it yields the corresponding rearranged indano endoethylene cyclopentanyl thiourea as a colorless crystalline solid, melting at 145°–146° C. after recrystallization from toluene.

The rearranged indano endoethylene cyclopentanyl isothiocyanate as well as the above thiourea are potent insecticides, the former against flies and mosquitoes, the latter against sucking and chewing insects, various worms, such as aphis, or bean beetles.

The phenyl group which is present in the molecule of the addition-rearrangement product permits the introduction of a great variety of substituents in that part of the molecule. One or more such substituents may be introduced into the phenyl ring. Typical groups which may be introduced include alkyl groups, such as methyl, ethyl, isopropyl, butyl, tert.-butyl, octyl, isooctyl, $\alpha,\alpha,\gamma,\gamma$-tetramethyl butyl, nonyl, etc., keto, such as the acetyl group, nitro, sulfonate, halogen, etc.

We claim:

As a new compound, an addition-rearrangement product of thiocyanic acid and 1,4-endomethylene tetrahydro-$\Delta^2$-fluorene, said product being an isothiocyanate boiling when pure at 178–182° C./2 mm.

HERMAN A. BRUSON.
THOMAS W. RIENER.